US010708667B1

(12) United States Patent
Waggoner et al.

(10) Patent No.: US 10,708,667 B1
(45) Date of Patent: Jul. 7, 2020

(54) COMBINING FRAGMENTS WITH DIFFERENT ENCODINGS (71) Applicant: Amazon Technologies, Inc., Seattle, WA (US)

(72) Inventors: Charles Benjamin Franklin Waggoner, Portland, OR (US); Joshua B. Barnard, Seattle, WA (US); Srikanth Kiran Kotagiri, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 345 days.

(21) Appl. No.: 15/195,301

(22) Filed: Jun. 28, 2016

(51) Int. Cl.
| H04N 21/6373 | (2011.01) |
| H04L 29/06 | (2006.01) |
| H04N 21/647 | (2011.01) |
| H04N 21/472 | (2011.01) |
| H04N 21/2387 | (2011.01) |
| H04N 21/262 | (2011.01) |

(52) U.S. Cl.
CPC ..... *H04N 21/6373* (2013.01); *H04L 65/4084* (2013.01); *H04L 65/602* (2013.01); *H04N 21/2387* (2013.01); *H04N 21/26266* (2013.01); *H04N 21/47202* (2013.01); *H04N 21/47217* (2013.01); *H04N 21/64738* (2013.01)

(58) Field of Classification Search
CPC ........... H04N 21/23412; H04N 21/845; H04N 21/85406; H04N 21/26258
See application file for complete search history.

(56) References Cited

U.S. PATENT DOCUMENTS

| 2012/0233228 | A1* | 9/2012 | Barton | H04L 67/06 707/827 |
| 2012/0324122 | A1* | 12/2012 | Miles | H04L 65/4084 709/231 |
| 2013/0042015 | A1* | 2/2013 | Begen | H04N 19/46 709/231 |
| 2013/0227075 | A1* | 8/2013 | Barnes | H04N 21/23412 709/219 |
| 2014/0344443 | A1* | 11/2014 | Macinnis | H04L 43/08 709/224 |
| 2014/0351318 | A1* | 11/2014 | Friedrich | H04L 29/08117 709/203 |
| 2014/0359152 | A1* | 12/2014 | Heng | H04L 65/602 709/231 |
| 2015/0071075 | A1* | 3/2015 | Ramakrishnan | H04L 65/4069 370/236 |
| 2015/0264096 | A1* | 9/2015 | Swaminathan | H04L 65/4084 709/219 |
| 2016/0366202 | A1* | 12/2016 | Phillips | H04N 21/26258 |
| 2018/0213296 | A1* | 7/2018 | Kellar | H04N 21/6338 |

* cited by examiner

*Primary Examiner* — Philip J Chea
*Assistant Examiner* — Mohammed Ahmed
(74) *Attorney, Agent, or Firm* — Weaver Austin Villeneuve & Sampson LLP (57) ABSTRACT

Methods and apparatus are described for combining fragments of media content that correspond to multiple quality levels. A particular combination of fragments may be selected for a client device based, at least in part, on feedback received from the client device. In this manner, adaptive bit rate selection can be simulated for a client device that does not support adaptive bit rate selection.

26 Claims, 8 Drawing Sheets

COMBINING FRAGMENTS WITH DIFFERENT ENCODINGS

BACKGROUND

The streaming or downloading of digital files has become a dominant mechanism for delivering content to a wide range of devices. Increasing consumer demand for higher and higher quality content poses significant technical challenges for existing infrastructure. Adaptive bit rate streaming of video on demand (VOD) content is an attempt to balance a number of competing priorities to deliver the highest quality user experience within available bandwidth.

To support adaptive bit rate streaming, media content (e.g., movies, television shows, videos, music, and electronic books) is pre-encoded and maintained as multiple sets of files, where each set of files corresponds to a different bit rate, or quality. A client device determines its bandwidth and hardware resources (e.g., available central processing unit (CPU) capacity) in real-time and adjusts the quality of the media content that is requested and played back on the user's device to account for changes in the bandwidth and hardware resources. Fragments at different quality levels, or bitrates, of the media content detailed in a manifest file are requested individually and stored in a buffer for playback.

DETAILED DESCRIPTION

This disclosure describes techniques for providing a single stream of fragments encoded at multiple quality levels (or bit rates) to a client device that does not have adaptive bit rate capability. The quality levels may be selected for the client device based, at least in part, on feedback provided by the client device. For example, the client device may provide feedback indicating a bandwidth of the client device, a latency of the client device (e.g., a time period between the transmission of a request for content by the client device and receipt of content), and/or an amount of data in a buffer of the client device. In this manner, adaptive bit rate selection may be "simulated" to provide a client device that does not have adaptive bit rate capability with the advantages of adaptive bit rate selection.

Typically, when a viewer requests media content (e.g., a movie, a television show, a video, a music track or album, an electronic book, etc.) to stream for playback on a device, the viewer's device uses a manifest file provided by a media server that details fragments, or segments of time, of the media content available at different quality levels. The viewer's device performs adaptive bit rate selection by selecting fragments of the media content that have been encoded at a lower quality (or bit rate) when conditions of the client device decline to avoid pauses during playback of the media content, and returns to selecting fragments of the media content that have been encoded at a higher quality when conditions of the client device improve. Therefore, the client device can perform adaptive bit rate selection to actively select the quality of content that it receives based upon its current conditions.

Adaptive bit rate systems aim to deliver the best sound and picture quality achievable using the Internet connection that is available to a client device at any given time. To support this capability, adaptive bit rate systems may periodically offer software updates that enable the client device to obtain the benefits of adaptive bit rate selection. While these updates are offered for numerous device types and models, these updates are often unavailable for legacy devices. As a result, a number of client devices do not have adaptive bit rate capability.

To improve the quality of content playback at legacy devices and other devices that do not support adaptive bit rate selection, a single stream that includes fragments that have been encoded at multiple quality levels (or bit rates) is provided. In this manner, adaptive bit rate selection is simulated to provide these devices the benefits of adaptive bit rate selection.

Figure 1:
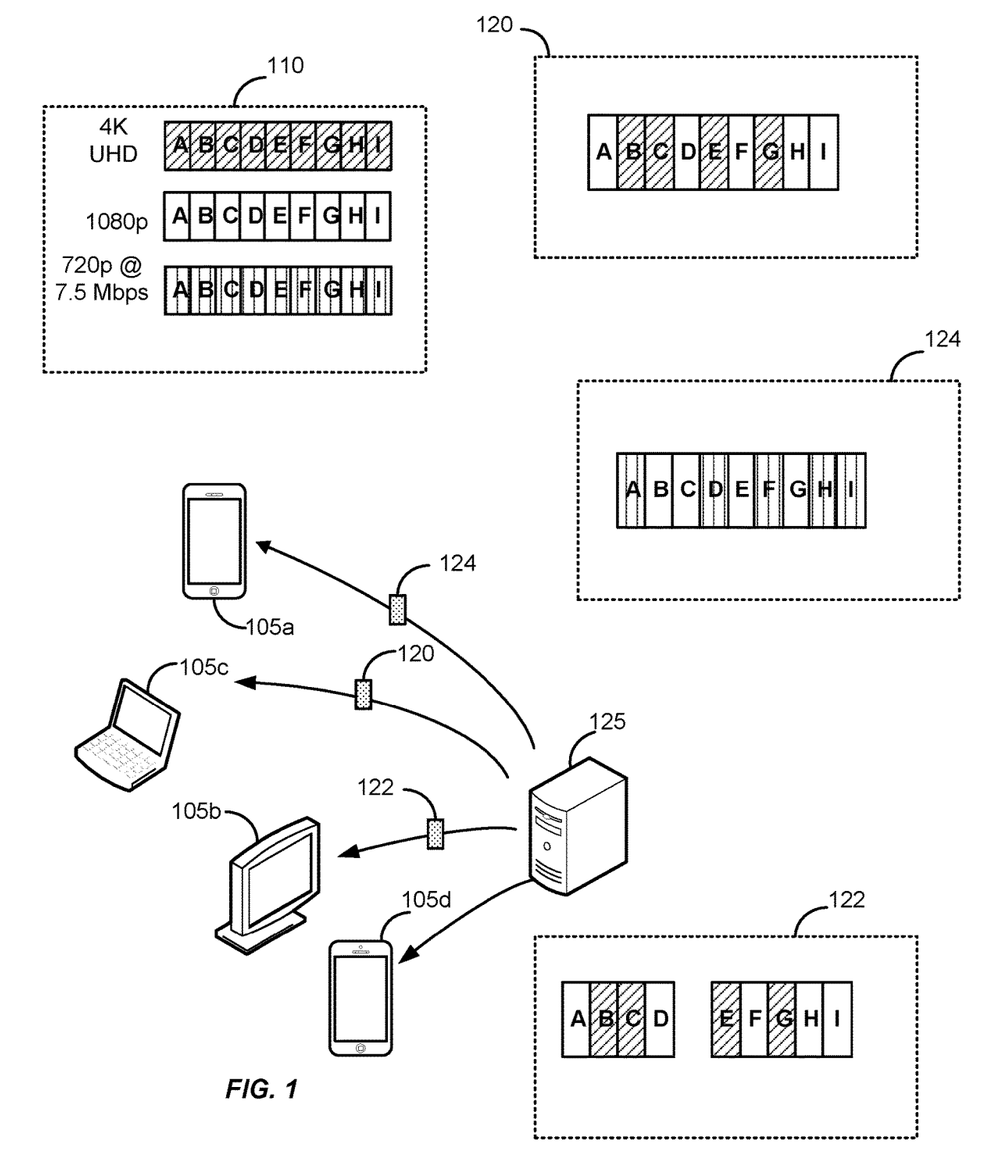
FIG. 1 illustrates an example of providing a stream including fragments encoded at multiple bit rates for media content playback.

FIG. 1 illustrates an example of providing a stream including fragments encoded at multiple bit rates. As shown in FIG. 1, viewer devices 105a, 105b, and 105c can request media content (e.g., episode #1 of the television show Blue Bloods). In the example of FIG. 1, media content 110 is encoded at three different quality levels. More particularly, media content 110 corresponds to segments or fragments A-I, which are available at the 4K UHD, 1080p, and 720p at 5 megabits per second (Mbps) video quality levels (or bitrates).

In this example, the media content 110 is encoded at a single resolution for each of the quality levels. In other implementations, the media content 110 may be encoded at multiple resolutions for each of the quality levels. For example, the media content 110 may be encoded at the 4K UHD quality level at three different resolutions, where each resolution corresponds to a different file.

In the example depicted in FIG. 1, devices 105a, 105b, and 105c do not support adaptive bit rate selection. As a result, they are incapable of processing a manifest to request fragments at different quality levels. However, device 105d does support adaptive bit rate selection. Thus, device 105d requests a manifest from media server 125 and requests fragments using its manifest based upon its current conditions. While a manifest enables fragments corresponding to the same segment of media content to be requested at multiple bit rates, the disclosed implementations enable a stream of fragments corresponding to multiple bit rates to be provided for sequential segments of the media content. In other words, the fragments include, for each of the bit rates, at least one fragment.

Viewer devices 105a, 105b, and 105c request playback of the same media content by providing requests to media server 125 to stream the media content for playback on viewer devices 105a, 105b, and 105c. In response, streams of fragments 120, 122, 124 are provided to devices 105c, 105b, and 105a, respectively.

A stream of fragments can be generated statically or dynamically (e.g., in response to a request from a viewer device). For a given device, a stream of media content includes fragments that correspond to consecutive segments of the media content, where the fragments include, for each of multiple bit rates, at least one fragment that has been encoded according to the bit rate. In other words, each of the fragments has been encoded at a single bit rate. The combination of fragments included in the stream may be selected based upon feedback received from the device relating, for example, to available bandwidth, latency, buffer depth, etc. The selection of a particular combination of fragments encoded at different bit rates for a particular device may be performed iteratively as additional feedback is received from the client device. In the depicted implementation, fragments 120, 122, and 124 are streamed by media server 125.

Fragmentation is an optional process applicable to the MPEG-4 file format. Fragmented MPEG-4 involves organizing fragments of media content in a contiguous MPEG-4 file. In contrast, a non-fragmented MPEG-4 file contains a single Media Data (mdat) box that includes all of the media content.

Fragmented MPEG-4 is used in a number of different streaming techniques. Since legacy devices often do not support fragmented MPEG-4, it is impossible to stream media content to these devices using such streaming techniques. In accordance with various implementations, media content can be streamed to client devices, regardless of whether they support fragmented MPEG-4.

In the example depicted in FIG. 1, media server 125 selects the combination of the 1080p and 4K UHD bit rates for devices 105a and 105b. More particularly, media server 125 determines that device 105a supports fragmented MPEG-4. Thus, media server 125 dynamically selects fragments that correspond to consecutive segments of the media content, where the fragments include, for each of the 1080p and 4K UHD bit rates, at least one fragment. The fragments may be selected based upon the feedback received from device 105a. Media server 125 transmits an MPEG-4 stream 120 containing the selected fragments to device 105c.

Device 105b does not support fragmented MPEG-4. As a result, device 105b cannot decode individual fragments provided via fragmented MPEG-4. Thus, rather than providing a stream of individual fragments, media server 125 provides file(s) to device 105b, where each file contains, for each of the 1080p and 4K UHD bit rates, at least one fragment. The file(s) may be retrieved or generated dynamically. In this example, rather than transmitting a single large file, media server 125 transmits two different files 122 to device 105 that each contains a different sequential subset of the stream of fragments 120 to device 105c. Together, the files 122 include a sequence of fragments that can be played by a media player of device 105b in consecutive order.

Next, media server 125 selects the combination of the 1080p and 720p @ 7.5 Mbps bit rates for device 105c based upon the feedback received from device 105c. Since device 105c also supports fragmented MPEG-4, media server 125 dynamically selects fragments that correspond to consecutive segments of the media content, where the fragments include at least one fragment encoded at the 1080p bit rate and at least one fragment encoded at the 720p @ 7.5 Mbps bit rate. Media server 125 transmits an MPEG-4 stream 124 containing the selected fragments to device 105a.

Viewer devices 105a, 105b, and 105c can provide feedback to media server 125, either on a periodic basis or as circumstances of the devices 105a, 105b, 105c change. For example, viewer device 105c might be a laptop running an application that sends feedback indicating a bandwidth of the Internet connection that device 105c uses to communicate with media server 125. As the available bandwidth increases, device 105c can provide additional feedback to media server 125. Media server 125 ascertains that the bandwidth of device 105c is increasing or has increased, and selects a new combination of bit rates that reflects the change in bandwidth of device 105a. In this example, media server selects the combination of bit rates 1080p and 4K UHD. Similarly, viewer device 105a might be a smartphone running an application that sends feedback indicating that its bandwidth is decreasing. Media server 125 selects the combination of bit rates 1080p and 720p @ Mbps that reflects the decrease in bandwidth of device 105a. Viewer device 105b might be a smart television implementing an application that sends feedback in a similar manner. In this manner, media server 125 may simulate adaptive bit rate selection that is typically performed by client devices by requesting fragments using manifest files.

Figure 2:
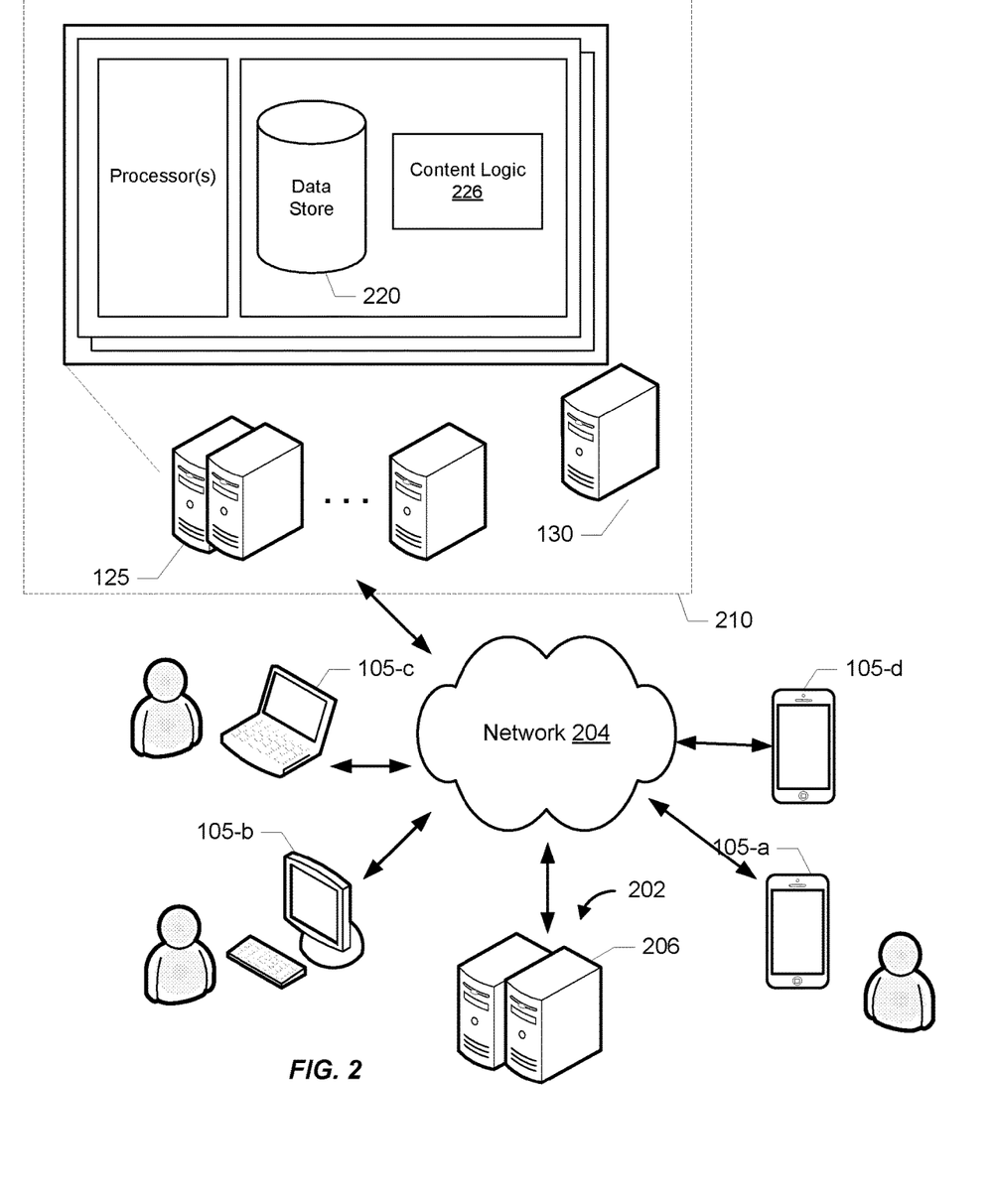
FIG. 2 illustrates an example of a computing environment in which a stream including fragments encoded at multiple bit rates can be provided for media content playback.

FIG. 2 illustrates an example of a computing environment in which a stream including fragments encoded at multiple bit rates can be provided for media content playback. The computing environment of FIG. 2 includes media server 125 which can be used to provide media content for playback on viewer devices 105a-d. In this example, viewer devices 105a and 10bd are smartphones, viewer device 105b is a television, and viewer device 105c is a laptop computer. Other types of devices such as desktop computers, video game consoles, tablets, wearable devices (e.g., smart watches), virtual reality headsets, etc. may also be included in the computing environment.

Media server 125 is an edge server of a content delivery network (CDN) 210. Media server 125 can provide fragments of the media content for streaming playback on viewer devices, as well as receive fragments or other information from other components of the CDN (e.g., origin servers and/or manifest servers). Media server 125 might provide the title of the media content, a cache key, and/or another type of identifier of the media content to manifest server 130 to request metadata pertaining to the media content. Media server 125 can also provide information regarding a viewer device making a request for media content to manifest server 130. In addition, media server 125 may provide manifest server 130 with information indicating a particular combination of bit rates. Manifest server 130 can use the information received from media server 125 to retrieve metadata such as a manifest for the media content.

Manifest server 130 can retrieve metadata indicating fragments of the media content at multiple bit rates (which may include or correspond to the selected combination of bit rates) and provide the metadata to media server 125. For example, the metadata can include a manifest file indicating the fragments for playback of the video portion of the media content at the 4K UHD, 1080p, 720p at 5 Mbps, and 720p at 7.5 Mbps quality levels and including information that can be used to access the fragments. As another example, the metadata may indicate one or more pre-generated files that correspond to a particular bit rate combination. Where more than one pre-generated file corresponds to a particular bit rate combination, the metadata may indicate the segments of the media content to which each file corresponds.

Rather than providing a device that does not support adaptive bit rate selection with a manifest, media server 125 selects a combination of two or more bit rates for the device based, at least in part, upon client feedback and uses the selected combination of bit rates to provide a combination of fragments at the different bit rates. As described herein, the combination of fragments includes, for each of the different bit rates, at least one fragment. More particularly, based upon the combination of bit rates selected for a given device, media server 125 can select fragments, select pre-generated file(s), or generate file(s), and provide the fragments or file(s), as described herein.

Media server 125 and/or manifest server 130 may be part of a content delivery system that conforms to any of a wide variety of architectures. In some implementations, the functionality of both media server 125 and manifest server 130 can be implemented within the same server, both within the same CDN, or across several servers. The functionality and components of media server 125 and manifest server 130 can use one or more servers and be deployed at one or more geographic locations (e.g., across different countries, states, cities, etc.) using a network such as any subset or combination of a wide variety of network environments including, for example, TCP/IP-based networks, telecommunications networks, wireless networks, cable networks, public networks, private networks, wide area networks, local area networks, the Internet, the World Wide Web, intranets, extranets, etc. Multiple entities may be involved in the delivery of media content and data related to the media content, including content providers, internet service providers (ISPs), providers of content delivery networks (CDNs), etc. The functionality described herein also may be implemented by one or more of different entities. For example, the functionality to provide playback of media content can be integrated into a video player or software client under control of one entity (e.g., on viewer devices 105a-c), integrated into a separate app from another entity, implemented in an edge server or content server of a CDN, a server of an ISP, etc.

It should be noted that, despite references to particular computing paradigms and software tools herein, the computer program instructions on which various implementations are based may correspond to any of a wide variety of programming languages, software tools and data formats, may be stored in any type of non-transitory computer-readable storage media or memory device(s), and may be executed according to a variety of computing models including, for example, a client/server model, a peer-to-peer model, on a stand-alone computing device, or according to a distributed computing model in which various functionalities may be effected or employed at different locations. In addition, reference to particular types of media content herein is merely by way of example. Suitable alternatives known to those of skill in the art may be employed.

Media server 125 can include various types of logic used to provide media content for playback at viewer devices 105a-c. In FIG. 2, media server 125 can include data store 220, which may store fragments of media content, manifests or associated metadata, client feedback, fragment quality values, and/or device profiles. Media server 125 can further include content logic 226 to provide fragments to viewer devices 105a-c, as described herein. Media server 125 also can include one or more processors 315, memory, and other hardware for performing the tasks disclosed herein.

In addition, manifest server 130 can include various types of logic used to retrieve and/or generate manifest files (or other metadata pertaining to media content) for facilitating the playback of media content by viewer devices 105a-c. Manifest server 130 and viewer devices 105a-c can also include processors, memory, and other hardware.

Content logic 226 can use data including manifest data, client feedback, fragment quality values indicating objective measures of visual quality of corresponding fragments, characteristics of client requests, and/or device profiles to provide a stream of fragments corresponding to multiple bit rates to viewer devices 105a-c. Manifest data can include data including details regarding fragments of the video portion of the playback for media content, details regarding fragments of the audio portion of the playback for media content, subtitles, and/or other types of data related to the playback of media content for different playback options.

The characteristics of a client request can include or be derived from parameter(s) of a request for media content transmitted by a viewer device. For example, parameters of the request can include a device identifier or other information that indicates a device type, a model type of the device, and/or a communication protocol, and therefore whether the device supports MPEG-4 (e.g., either conventional or fragmented). In one implementation, the device identifier may be used to access a device profile of the corresponding device.

Device profiles of viewer devices can indicate device characteristics or capabilities such as hardware and/or software capabilities. For example, device characteristics/capabilities can include, but are not limited to, device type (e.g., smartphone, laptop computer, tablet, HD television), model, screen size or resolution, operating system, and/or memory capacity. Software capabilities can include, for example, operating system type, operating system version, supported communication protocols, and/or stream processing capabilities (e.g., whether the device supports MPEG-4 or fragmented MPEG-4). In addition, device profiles may indicate additional device capabilities such as video codec(s) that are supported, profiles that can be decoded, level(s) associated with a decoder of the device, audio decoder capabilities, maximum frame rate, and/or maximum frame size.

The device profiles may also include aggregated information pertaining to the feedback the client devices have communicated to CDN 210. For example, the feedback received from one of the client devices may indicate a bandwidth, latency, and/or amount of available buffer space associated with the client device.

Content logic 226 may select a combination of bit rates for a given device. After selecting the combination of bit rates suitable for the device, content logic 226 may select fragments or file(s) for playback. More particularly, content logic 226 selects a combination of fragments corresponding to consecutive segments of the media content, where the fragments include, for each of the selected bit rates, at least one fragment. Content logic 226 may select a combination of sequential fragments in the form of individually selected fragments or file(s) that each contains multiple fragments. A file may be pre-generated or dynamically generated. For example, content logic 226 may determine whether to provide the combination of sequential fragments in the form of individual fragments or file(s) based, at least in part, on whether device supports fragmented MPEG-4. Media server 125 may make this determination and select the combination of fragments using information in data store 220. In some implementations, the data within data store 220 can be dynamic and changing through time and may be provided from a variety of sources.

Typically, it is assumed that fragments encoded at a higher bit rate will provide a superior user experience to fragments encoded at a lower bit rate. However, providing fragments encoded at a higher bit rate consumes valuable bandwidth and the fragments encoded at the higher bit rate are not necessarily of better quality (e.g., visual or audio) than fragments encoded at a lower bit rate. In one implementation, media server 125 selects a combination of sequential fragments for a number of consecutive segments based, at least in part, on the selected bit rates and quality values associated with sets of fragments that have each been encoded at a corresponding one of the selected bit rates. More particularly, media server 125 may select fragments or generate file(s) based, at least in part, on the bit rates and quality values. The quality values may serve as an objective measure of the visual (or audio) quality of the fragments. The quality value associated with a fragment may be determined based upon characteristics of the fragment, as will be described in further detail below.

Each fragment can be represented by a set of parameters that can be used to determine its associated quality value. The set of parameters can include parameters associated with the fragment and/or its constituent frames. For video fragments, such frame parameters might include, for example, quantization parameters, rate factors, frame size, frame type, what portion of a frame is intra versus predicted, the degree of motion in a frame, whether a frame is black, whether a frame is part of a fade, peak signal-to-noise ratio (PSNR), a codec's internal metric(s) (e.g., Rate Factor in x264 and x265), relative and absolute number of bits spent on intra prediction, motion vectors, residual coding, chroma information, luma information, spatial and temporal frequency distribution, what other frames such frames reference, what frames they are referenced by, position in the fragment, position in a scene, if a frame starts or ends a fragment, Structural Similarity (SSIM), Motion-based Video Integrity Evaluation (MOVIE) index, Tektronix PQA, etc. For audio fragments, such parameters might include, for example, quantization parameters, PSNR, Perceptual Evaluation of Audio Quality (PEAU), etc. A parameter for a given fragment or group of fragments may not necessarily be derived from its constituent frames but may be any information by which the fragment can be reliably compared and classified in a manner that is predictive of perceived quality.

Figure 3:
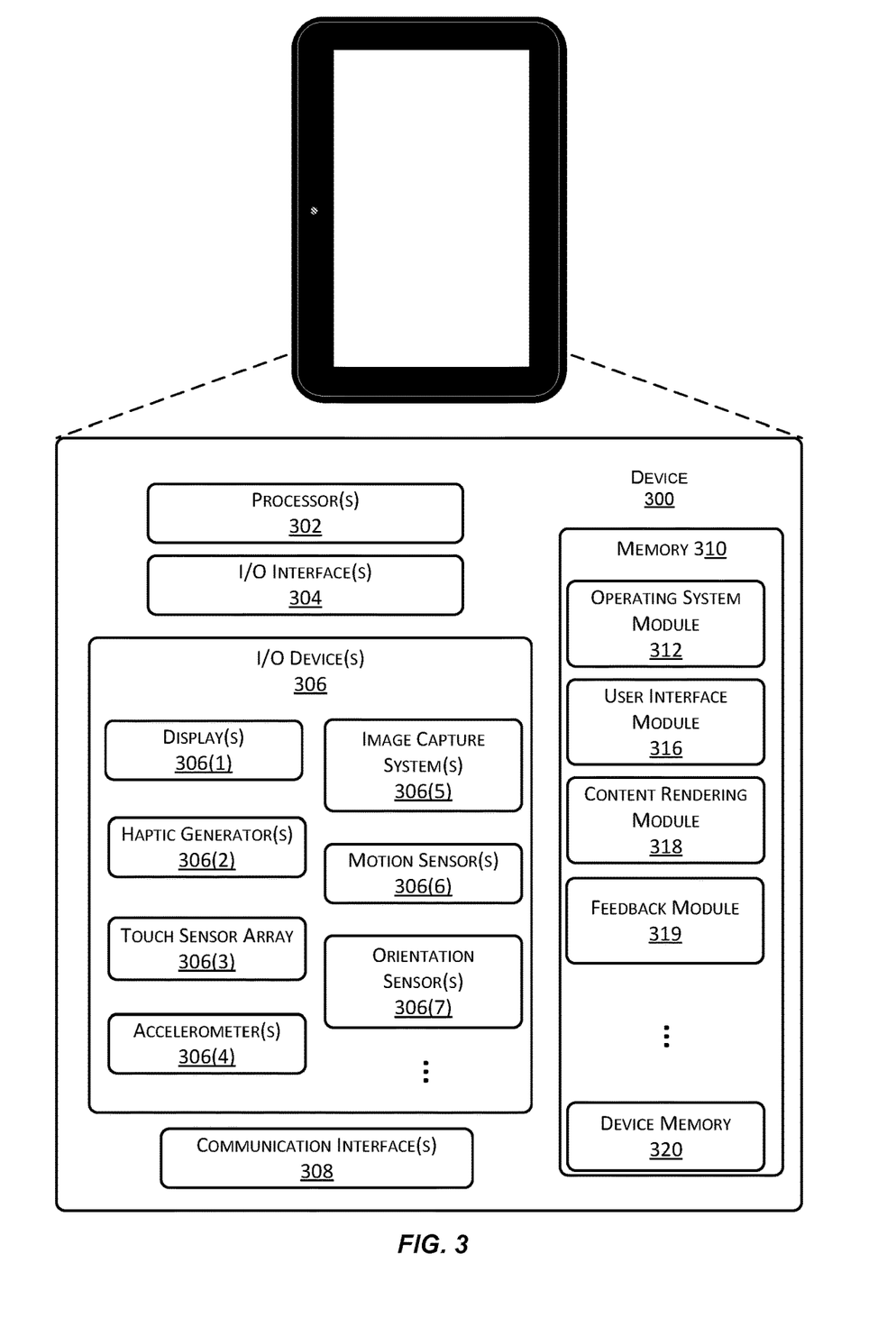
FIG. 3 is a simplified block diagram illustrating an electronic device that may be employed with various implementations.

FIG. 3 is a simplified block diagram illustrating an electronic device that may be employed with various implementations. Device 300 includes one or more single or multi-core processors 302 configured to execute stored instructions (e.g., in device memory 310). Device 300 may also include one or more input/output (I/O) interface(s) 304 to allow the device to communicate with other devices. I/O interfaces 304 may include, for example, an inter-integrated circuit (I2C) interface, a serial peripheral interface (SPI) bus, a universal serial bus (USB), an RS-232 interface, a media device interface, and so forth. I/O interface(s) 304 is coupled to one or more I/O devices 306. The I/O device(s) 306 may include one or more displays 306(1), one or more haptic generators 306(2), a touch sensor array 306(3), one or more accelerometers 306(4), one or more image capture systems 306(5), one or more motion sensors 306(6), one or more orientation sensors 306(7), microphones, speakers, and so forth. The one or more displays 306(1) are configured to provide visual output to the user and may comprise any of a variety of display types including, for example, any type of reflective or transmissive display. Touch sensor array 306(3) may be a capacitive sensor array having a matrix of conductors that are scanned to determine, for example, the location, duration, speed and direction of touch events within the matrix based on changes in electrical capacitance.

Device 300 may also include one or more communication interfaces 308 configured to provide communications between the device and other devices. Such communication interface(s) 308 may be used to connect to cellular networks, personal area networks (PANs), local area networks (LANs), wide area networks (WANs), and so forth. For example, communications interfaces 308 may include radio frequency modules for a 3G or 4G cellular network, a WiFi LAN and a Bluetooth PAN. Device 400 also includes one or more buses or other internal communications hardware or software that allow for the transfer of data and instructions between the various modules and components of the device.

Device 300 also includes one or more memories (e.g., memory 310). Memory 310 includes non-transitory computer-readable storage media that may be any of a wide variety of types of volatile and non-volatile storage media including, for example, electronic storage media, magnetic storage media, optical storage media, quantum storage media, mechanical storage media, and so forth. Memory 310 provides storage for computer readable instructions, data structures, program modules and other data for the operation of device 300. Memory 310 includes at least one operating system (OS) module 312 configured to manage hardware resources such as I/O interfaces 304 and provide various services to applications or modules executing on processor(s) 302. Memory 310 also includes a user interface module 316, a content rendering module 318, feedback module 319, and other modules.

Feedback module 319 may be configured to monitor the current status of device 300. For example, feedback module 319 may monitor the bandwidth, latency between media content request and receipt of fragments, and/or amount of content in a buffer of device 300. Feedback module 319 may transmit feedback pertaining to the status of device 300 to CDN 110. For example feedback module 319 may transmit feedback periodically (e.g., after a predetermined period of time) or after a change in the status of device 300 is detected. In one implementation, feedback module 319 transmits feedback if the change in status exceeds a particular threshold.

Content rendering module 318 may be configured to transmit a request to a media server (e.g., edge server) for media content. If device 300 supports fragmented MPEG-4, device will receive fragments of the media content. However, if device 300 does not support fragmented MPEG-4, device 3020 will receive one or more non-fragmented MPEG-4 file(s). Each of the files can contain multiple fragments. Fragments may be downloaded for playback via device 300.

Memory 310 also includes device memory 320 to store a wide variety of instructions and information using any of a variety of formats including, for example, flat files, databases, linked lists, trees, or other data structures. Such information includes content for rendering and displaying on display 306(1) including, for example, any type of video content. In some implementations, a portion of device memory 320 may be distributed across one or more other devices including servers, network attached storage devices, and so forth.

The logic or computer program instructions used to support the monitoring and transmission of feedback (represented by feedback module 319) may be implemented in a variety of ways. For example, at least some of this functionality may be implemented as part of the code of a media player operating on device 300. And as mentioned above, implementations are contemplated in which at least a portion of the logic or computer program instructions may reside on a separate platform, e.g., media server 125, manifest server 130, etc. Suitable variations and alternatives will be apparent to those of skill in the art. It will also be understood that device 300 of FIG. 3 is merely an example of a device with which various implementations of the present invention may be practiced, and that a wide variety of other devices types may also be used (e.g., devices 105-*a* to 105-*c*). The scope of the invention should therefore not be limited by reference to device-specific details.

A specific implementation will now be described with reference to FIG. 1, the computing environment of FIG. 2, and FIGS. 4-8.

Figure 4:
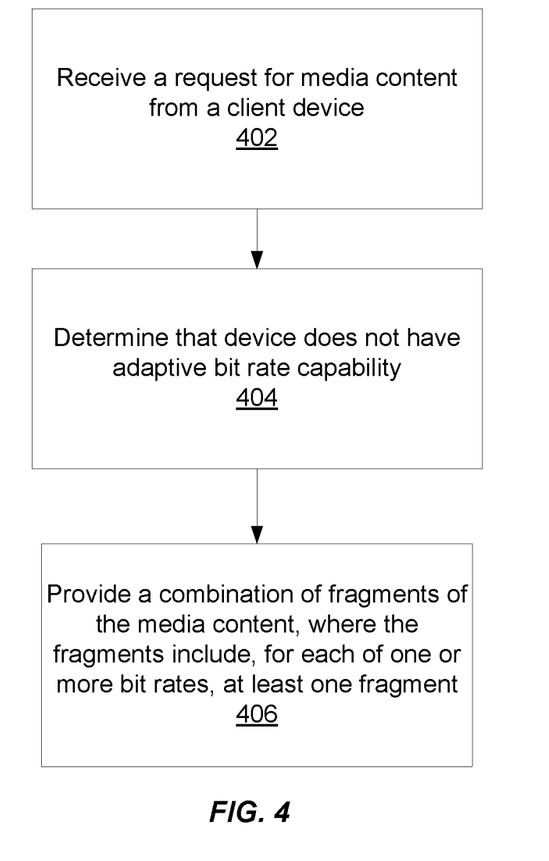
FIG. 4 is a flowchart illustrating a method of providing fragments for media content playback.

FIG. 4 is a flowchart illustrating a method of providing fragments for media content playback. Media server 125 receives a request for media content from a client device (402). Media server 125 may determine that the device does not have adaptive bit rate capability (404). For example, media server 125 may make this determination based upon parameters of the request and/or information in a device profile of the client device. Media server provides a combination of fragments of the media content to the device, where the fragments include, for each of one or more bit rates (406), at least one fragment. More particularly, each of the fragments corresponds to a different one of a plurality of sequential segments of the media content. In one implementation, the bit rates include two or more bit rates. The fragments may be provided either in the form of individual fragments or files containing fragments, as will be described in further detail below.

Figure 5:
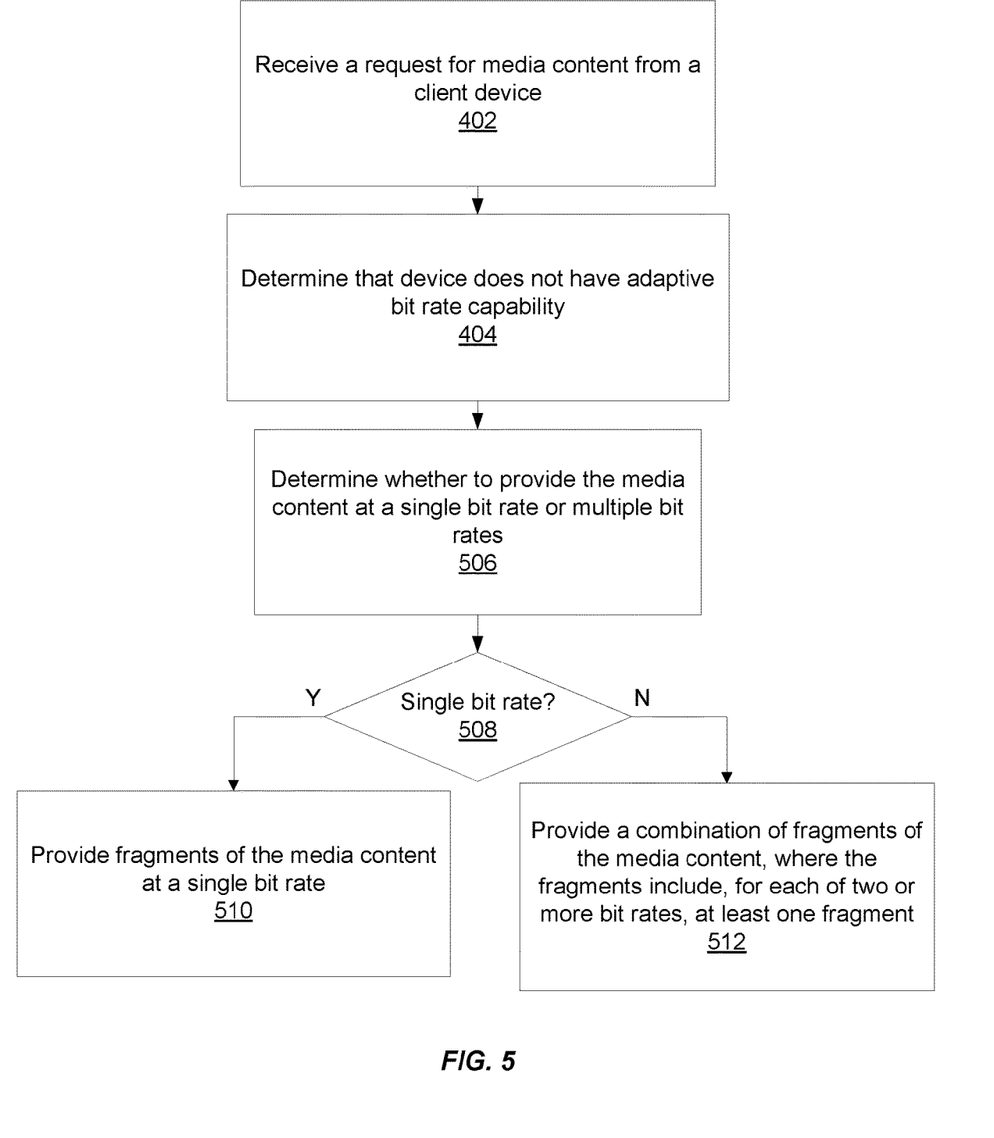
FIG. 5 is a flowchart illustrating a method of providing fragments for media content playback according to a particular implementation.

In some instances, it may be desirable to stream the media content at a single bit rate (e.g., the highest available bit rate). As shown in FIG. 5, media server 125 may determine whether to provide the media content at a single bit rate or multiple bit rates (506). Media server 125 may determine whether to provide the media content at a single or multiple bit rates based, at least in part, on feedback received from the client and/or device capabilities. For example, media server 125 may determine whether the client device supports the highest bit rate available. If media server 125 determines that it will provide the media content at a single bit rate (508), media server 125 provides fragments of the media content at a single (e.g., highest) bit rate (510). For example, where the client device will support the highest bit rate (e.g., 4K UHD), media server 125 may stream fragments of the media content at the highest bit rate.

In one implementation, media server 125 may determine whether the client device can support frames of different sizes based, at least in part, upon device capabilities indicated in a device profile, parameters of the request, and/or device discovery messages. Where media server 125 ascertains that the client device can switch between different frame sizes, the fragments that it provides to the client device need not have the same resolution or frame size. In other words, the resolution of one fragment provided to the client device may differ from the resolution of another fragment provided to the client device. Thus, media server 125 may select the frame size or resolution of fragments (or corresponding file(s)) to provide to the client device.

If media server 125 determines that it will provide the media content at multiple bit rates (508), media server 125 may provide a combination of fragments of the media content, where the fragments include, for each of two or more bit rates, at least one fragment (512). The frame size of each of the fragments that are provided may be the same. Alternatively, where the client device supports frames of different sizes, the frame size of frames of one fragment may be larger than that of frames of another fragment.

Figure 6:
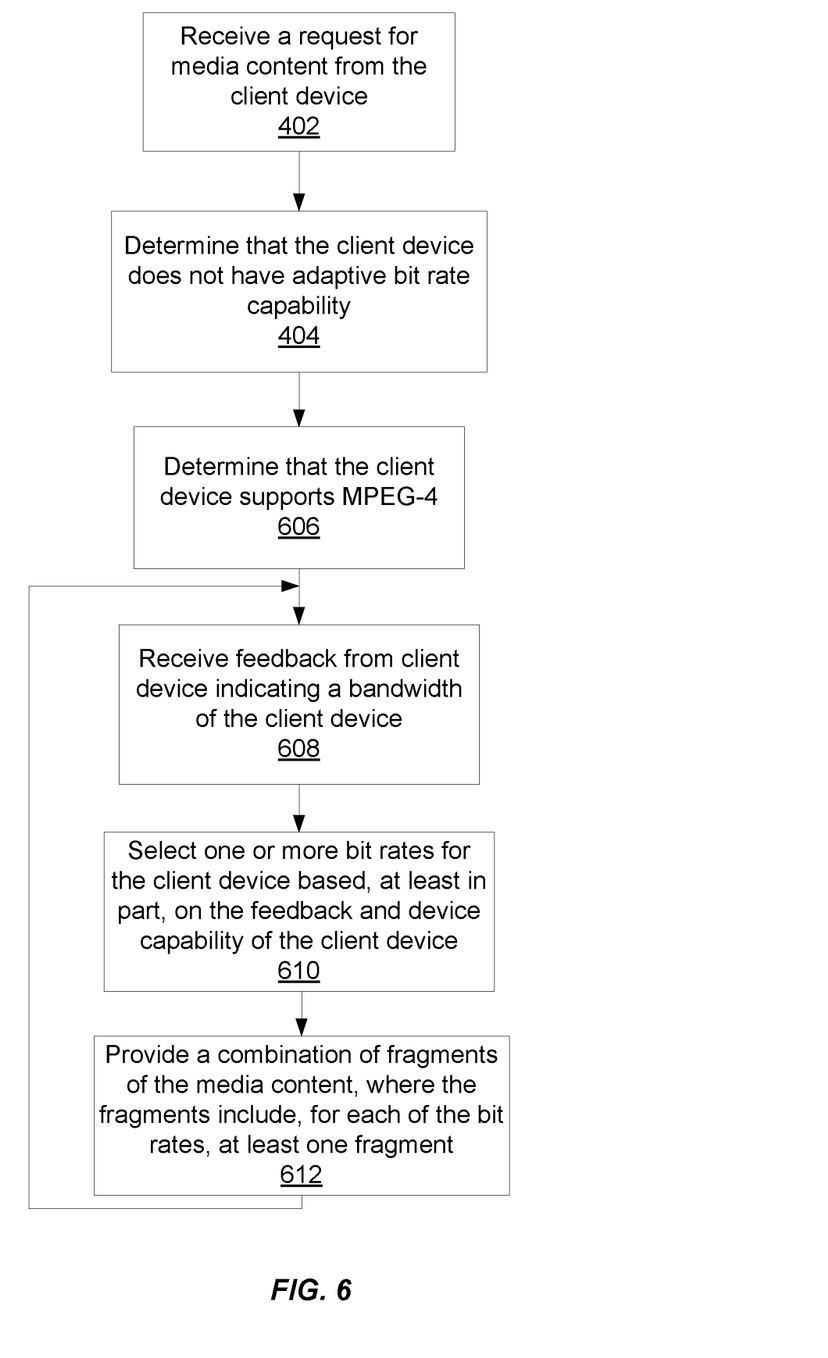
FIG. 6 is a flowchart illustrating a method of providing fragments for media content playback according to another implementation.

FIG. 6 is a flowchart illustrating a method of providing fragments for media content playback according to a particular implementation. Media server 125 may determine that the device supports MPEG-4 (606). Media server 125 may periodically receive feedback from the device (608). As described above, the feedback may indicate the bandwidth of the device, as well as other information. Media server 125 can select a combination of one or more bit rates for the device based at least in part, on the feedback and device capability (610). For example, device capability of the client device may be ascertained from a device profile and/or information provided by the client device in the request. Where media server 125 has already selected a combination of bit rates for the device, media server 125 may choose to alter the combination of bit rates or use the previously selected combination of bit rates.

A combination of fragments corresponding to the selected bit rates may be provided (612), where the fragments include, for each of the selected bit rates, at least one fragment. Individual fragments may be dynamically selected and provided via fragmented MPEG-4. Alternatively, file(s) that each contains multiple fragments may be provided in instances where the device does not support fragmented MPEG-4. More particularly, each file may include, for each of the selected bit rates, at least one fragment. Each file may be retrieved or dynamically generated. As will be described in further detail below with reference to FIGS. 7 and 8, quality values associated with fragments encoded at the selected bit rates may be used to select the combination of fragments, either for dynamic fragment selection or the generation of files. Media server 125 continues to proceed at 508 as further feedback is received from the client device.

Figure 7:
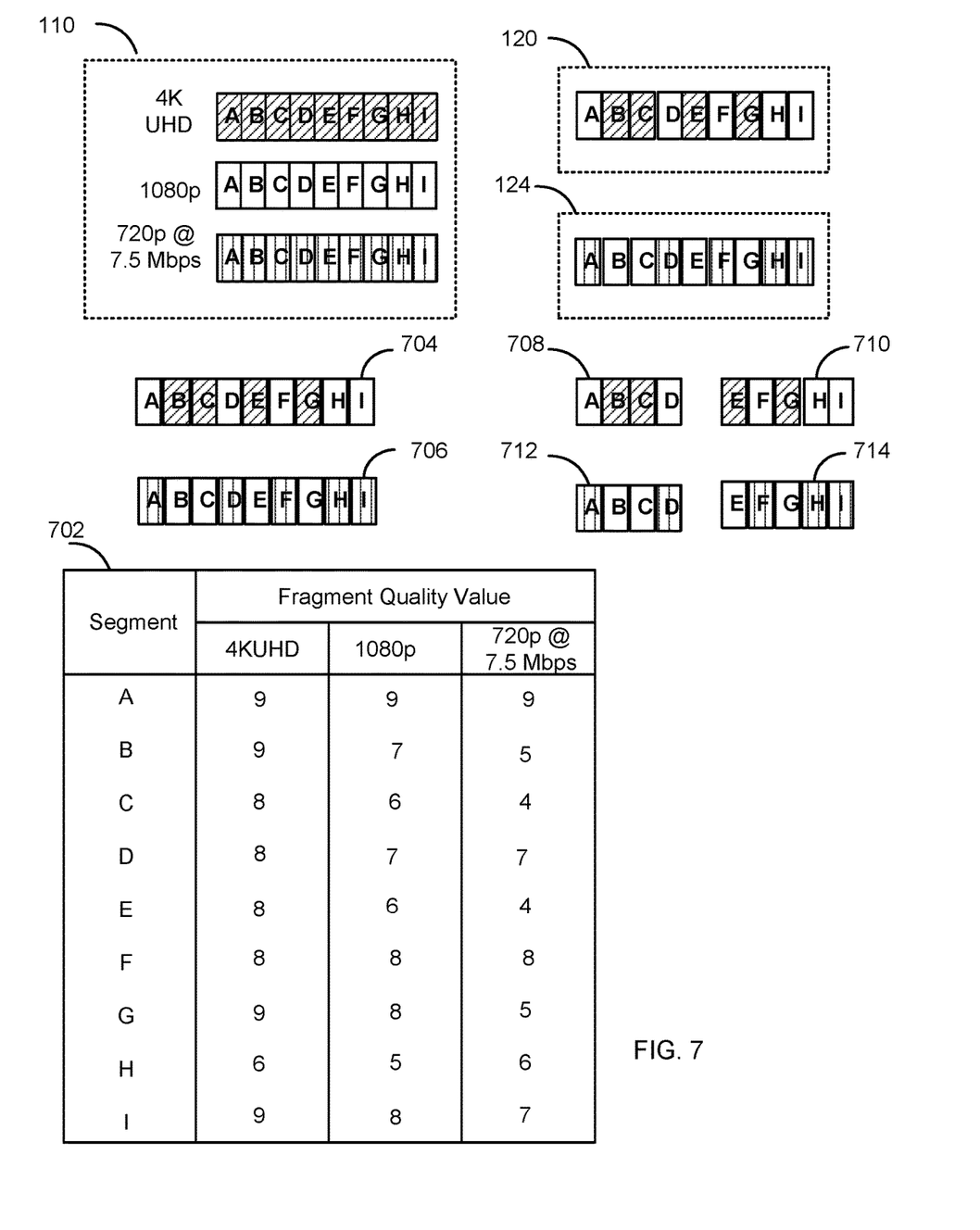
FIG. 7 is a diagram illustrating the use of quality values in accordance with various implementations.

FIG. 7 is a diagram illustrating the use of quality values in accordance with various implementations. As shown in FIG. 7, quality values 702 may be maintained for each of the fragments of the media content corresponding to each of the bit rates in which the media content has been encoded. Specifically, each fragment has an associated fragment quality value that serves as an objective measure of the visual quality of that fragment. In this example, fragments having higher quality values are assumed to be of better visual quality than fragments having lower quality values.

The quality values 702 may be used to dynamically select fragments for devices that support fragmented MPEG-4. For example, stream 120 may be generated based, at least in part, on the quality values 702 for the fragments of the media content encoded at the 4K UHD and 1080p bit rates. Similarly, stream 124 may be generated based, at least in part, on the quality values 702 for the fragments of the media content encoded at the 1080p and 720p @ 7.5 Mbps bit rates.

In addition, the quality values 702 may be used to generate files that may be provided to client devices that do not support fragmented MPEG-4. In this example, file 704 includes fragments of the media content that correspond to multiple segments of playback time of the media content, where the fragments include a first set of fragments 708 encoded at the 4K UHD bit rate and a second set of fragments 710 encoded at the 1080p bit rate. Similarly, file 706 includes fragments of the media content that correspond to multiple segments of playback time of the media content, where the fragments include a first set of fragments 712 encoded at the 1080p bit rate and a second set of fragments 714 encoded at the 720p @ 7.5 Mbps bit rate.

In some instances, a file such as 704 of 706 containing fragments corresponding to all segments of the media content may be provided. In other instances, it may be desirable to provide the media content in the form of multiple files, as shown at 708, 710 and 712, 714. By providing the media content in the form of multiple files, it is possible to insert an advertisement on legacy platforms.

Files that are generated need not include fragments that correspond to all of the segments of playback time. However, for a given stream provided to the same client device, the fragments will each correspond to a different segment of playback time. Each file may be stored in association with a corresponding combination of bit rates. For example, the combination of bit rates may be used as an index to access a corresponding file.

Fragments for a particular combination of bit rates can be selected by comparing the quality values of fragments for a particular segment of the media content, where each of the fragments for the segment is encoded at a different one of the bit rates. For example, to generate stream 120, file 704, or file 708, it is typically assumed that a fragment encoded at the higher bit rate, 4K UHD, is of higher quality than a fragment encoded at the lower bit rate, 1080p. However, as shown in this example, for a first segment of the media content, referred to as segment A in this example, the quality value for the fragment encoded at the 1080p bit rate and the fragment encoded at the 4K UHD bit rate is 9. In this particular example, the first segment of the media content corresponds to a black screen. Since the visual quality is the same for the fragments encoded at the higher and lower bit rate for the first segment of the media content, the fragment encoded at the lower, 1080p bit rate is selected for segment A.

As another example, to generate stream 124, file 706, or file 714, a first set of fragments encoded at the 1080p bit rate and a second set of fragments encoded at the 720p @ 7.5 Mbps bit rate are combined to generate a sequence of fragments. For example, for segment I of the media content, the quality value for the fragment encoded at the 1080p bit rate is 8, while the quality value for the fragment encoded at the 720 Mbps bit rate is 7. While the quality value for the fragment encoded at the higher bit rate is greater than that for the fragment encoded at the lower bit rate, the difference in quality values may be deemed to be insignificant. Since the user experience would not be substantially improved by providing the fragment encoded at the higher bit rate in this example, the fragment encoded at the lower, 720 Mbps bit rate is selected for fragment I.

In some instances, the quality value for a fragment encoded at a lower bit rate may be higher than the quality value for a fragment encoded at a higher bit rate. In this example, to generate stream 124, file 706, or file 714, for segment H of the media content, the quality value for the fragment encoded at the 1080p bit rate is 5, while the quality value for the fragment encoded at the 720 Mbps bit rate is 6. Since the fragment encoded at the 720 Mbps bit rate contains less detail, it also exhibits fewer artifacts. Therefore, the fragment encoded at the lower, 720 Mbps bit rate is of a higher quality and is selected for fragment H.

In other implementations, fragments may be combined according to one or more rules. For example, it may be desirable to ensure that the average quality values of the fragments corresponding to multiple segments of the media content that are transmitted over time meets or exceeds a particular threshold. As another example, it may be desirable to ensure that the fragments corresponding to initial segments of the media content have a higher average value than the fragments corresponding to segments at the end of the media content.

While the examples described above refer to a combination of fragments encoded at two different bit rates, these examples are merely illustrative. Therefore, fragments that have been encoded at more than two bit rates or a single bit rate may also be combined, as described herein.

Figure 8:
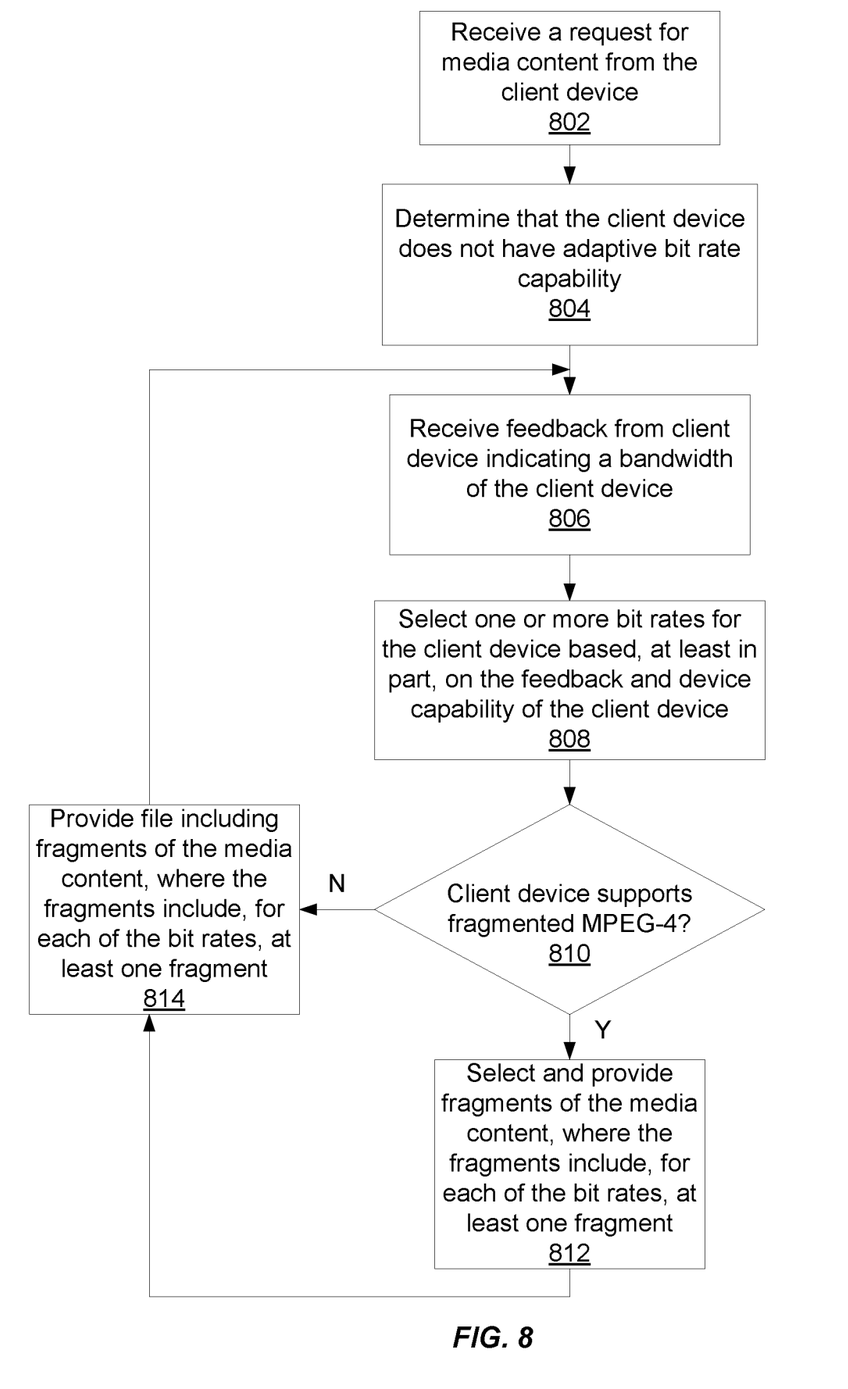
FIG. 8 is a flowchart illustrating a method of providing fragments according to a particular implementation.

FIG. 8 is a flowchart illustrating a method of providing fragments according to a particular implementation. Media server 125 receives a request for media content (802) from a client device. Media server 125 determines that the client device does not support adaptive bit rate selection (804). Media server 125 receives feedback from the client device (806). As described above, the feedback may indicate a bandwidth of the client device and/or additional information.

Media server 125 selects a combination of one or more bit rates for the client device (808) based, at least in part, on the feedback received from the client device and device capabilities. For example, device capabilities of the client device may be ascertained from a device profile and/or information provided by the client device in the request. In one implementation, media server 125 determines whether the client device supports fragmented MPEG-4 (810).

If the client device supports fragmented MPEG-4, media server 125 dynamically selects and provides fragments of the media content, where the fragments include, for each of the bit rates, at least one fragment (812). Typically, the decision to switch bitrates made by a client device during adaptive bitrate streaming is based upon current bandwidth and the assumption that a fragment that consumes more bits will look better. As a result, where there is available bandwidth, the client device will typically request the larger fragment. In one implementation, media server 125 selects a media fragment for a segment of the media content on behalf of the client device based, at least in part, on a current bandwidth and media fragment quality values of those fragments corresponding to the segment of media content and the different bit rates.

A fragment corresponding to a higher bit rate is typically assumed to be of a higher visual quality since it includes a greater number of bits than the fragment corresponding to a lower bit rate. However, rather than assuming that the fragment that includes a greater number of bits will provide a better viewing experience for the user, media server 125 compares, for a segment of the media content, the quality values of fragments that have each been encoded at a different bit rate. Using this objective measure of the visual quality of the fragments, media server 125 selects one of the fragments based, at least in part, upon a result of the comparison.

Where the visual qualities of the fragments for a particular segment are equal, media server 125 may select the fragment corresponding to the lowest bit rate. However, in many instances, the visual quality of the fragments will not be identical. Where the quality values of the fragments for a given segment are not equal, media server 125 may select one of the fragments based upon various criteria including, but not limited to, the bit rates corresponding to the fragments, the quality values of the fragments, the differential between quality values of the fragments, and/or an average quality value over multiple segments of the media content. In some instances, media server 125 may select the fragment corresponding to the highest quality value. For example, where the difference between the quality values of the fragments for a given segment (e.g., between the highest quality value and the remaining quality values of the other fragments) meets a threshold differential, media server 125 may select the fragment corresponding to the highest quality value. Alternatively, where the quality value of a fragment corresponding to a relatively high bit rate represents an insubstantial improvement in user experience relative to a fragment corresponding to a lower bit rate, media server 125 may select the fragment corresponding to the lower bit rate. As another example, media server 125 may optimize an average fragment quality over multiple segments. Such optimization may be performed such that the average quality is maximized for playback of all segments of the media content or only a subset of the segments of the media content.

Alternatively, if the client device does not support fragmented MPEG-4, media server 125 provides file(s) that each includes fragments corresponding to the combination of bit rates (814). More particularly, file(s) may each include, for each of the bit rates, at least one fragment such that the file contains multiple fragments that can be played sequentially at the client device. The file(s) may be generated dynamically or retrieved from previously generated files. For example, media server 125 may use the combination of bit rates as an index to identify one or more files corresponding to the combination of bit rates. In some instances, rule(s) such as optimization of average fragment quality over multiple segments of the media content may be used to select the appropriate file(s) to provide to the client device, as described herein. Each file may be identified by a corresponding uniform resource locator (URL).

Media server 125 may track the fragments or files associated therewith that are provided to the client device. Subsequently, media server 125 can provide further fragments or files that correspond to subsequent segments of the media content as additional feedback is received from the client device.

In some instances, the client device may stop playback and rebuffer. A new stream may then be generated and provided based, at least in part, upon recent feedback (806).

While the subject matter of this application has been particularly shown and described with reference to specific implementations thereof, it will be understood by those skilled in the art that changes in the form and details of the disclosed implementations may be made without departing from the spirit or scope of the invention. Examples of some of these implementations are illustrated in the accompanying drawings, and specific details are set forth in order to provide a thorough understanding thereof. It should be noted that implementations may be practiced without some or all of these specific details. In addition, well known features may not have been described in detail to promote clarity. Finally, although various advantages have been discussed herein with reference to various implementations, it will be understood that the scope of the invention should not be limited by reference to such advantages. Rather, the scope of the invention should be determined with reference to the appended claims.

What is claimed is:

1. A method, comprising:
    processing, by one or more servers, a request for media content received from a client device;
    determining, by the servers, that the client device does not have adaptive bit rate capability to use a manifest to request, according to conditions of the client device, fragments of the media content that have been encoded in a particular bit rate;
    processing, by the servers, feedback received from the client device, the feedback including an indication of at least one of a bandwidth of the client device, a latency of the client device, or an amount of content in a buffer of the client device;
    determining, by the servers, that the client device supports MPEG-4 file format;
    after determining that the client device does not have adaptive bit rate capability to use a manifest to request fragments of the media content that have been encoded in a particular bit rate, selecting, by the servers, one or more bit rates for the client device based, at least in part, on the feedback received from the client device and capabilities of the client device; and
    transmitting, by the servers to the client device, a plurality of fragments of the media content, each of the plurality of fragments corresponding to a different one of a plurality of consecutive segments of playback time of the media content;
    wherein the fragments include, for each of the bit rates selected by the servers, at least one fragment.

2. The method as recited in claim 1, further comprising:
    retrieving or generating, by the servers, at least one file including the fragments of the media content;
    wherein transmitting the plurality of fragments includes transmitting the file to the client device.

3. The method as recited in claim 1, wherein the bit rates include two or more bit rates, the method further comprising:
    for one of the consecutive segments of playback time of the media content, ascertaining, by the servers, quality values associated with two or more fragments of the media content, each one of the two or more fragments corresponding to a different one of the bit rates, each of the quality values being a measure of a visual quality of a corresponding one of the two or more fragments of the media content; and
    selecting, by the servers, one of the two or more fragments based, at least in part, on the quality values.

4. The method as recited in claim 1, further comprising:
    determining, by the servers, whether the client device supports fragmented MPEG-4 file format;
    wherein transmitting the fragments of the media content is performed based, at least in part, on whether the client device supports fragmented MPEG-4 file format.

5. A method, comprising:
    processing, by one or more servers, a request for media content received from a client device;
    determining, by the servers, that the client device does not have adaptive bit rate capability to use a manifest to request, according to conditions of the client device, fragments of the media content that have been encoded in a particular bit rate;
    obtaining, by the servers, information indicating feedback transmitted by the client device;
    after determining that the client device does not have adaptive bit rate capability to use a manifest to request fragments of the media content that have been encoded in a particular bit rate, selecting, by the servers, one or more bit rates for the client device based, at least in part, on the information indicating the feedback transmitted by the client device and capabilities of the client device; and
    transmitting, by the servers to the client device, a plurality of fragments of the media content, each of the fragments corresponding to a different one of a plurality of consecutive segments of playback time of the media content;
    wherein the fragments include, for each of the one or more bit rates selected by the servers, at least one fragment.

6. The method as recited in claim 5, wherein the feedback indicates at least one of: a bandwidth of the client device, a latency of the client device, or an amount of content in a buffer of the client device.

7. The method as recited in claim 5, wherein the capabilities of the client device comprise at least one of: screen size, screen resolution, video codec(s) that are supported, audio decoder capabilities, maximum frame rate, or maximum frame size.

8. The method as recited in claim 5, further comprising:
retrieving or generating, by the servers, at least one file including the fragments of the media content;
wherein transmitting the plurality of fragments includes transmitting the file to the client device.

9. The method as recited in claim 5, further comprising:
selecting, by the servers, the bit rates and fragments in response to receiving the request for media content after determining that the client device does not have adaptive bit rate capability.

10. The method as recited in claim 5, wherein the bit rates include two or more bit rates, the method further comprising:
for one of the consecutive segments of playback time of the media content, ascertaining, by the servers, quality values associated with two or more fragments of the media content, each of the two or more fragments corresponding to a different one of the bit rates, each of the quality values being a measure of a visual quality of a corresponding one of the two or more fragments of the media content; and
selecting, by the servers, one of the two or more fragments based, at least in part, on the quality values such that the plurality of fragments includes the selected one of the two or more fragments.

11. The method as recited in claim 5, further comprising:
determining, by the servers, that the client device supports MPEG-4 file format, wherein the plurality of fragments are transmitted according to the MPEG-4 file format.

12. The method as recited in claim 5, further comprising:
determining, by the servers, whether the client device supports fragmented MPEG-4 file format;
wherein transmitting the fragments of the media content is performed based, at least in part, on whether the client device supports fragmented MPEG-4 file format.

13. A system, comprising:
one or more computing devices configured to:
process a request for media content received from a client device;
determine that the client device does not have adaptive bit rate capability to use a manifest to request, according to conditions of the client device, fragments of the media content that have been encoded in a particular bit rate;
obtain information indicating feedback transmitted by the client device;
after determining that the client device does not have adaptive bit rate capability to use a manifest to request fragments of the media content that have been encoded in a particular bit rate, select one or more bit rates for the client device based, at least in part, on the information indicating the feedback transmitted by the client device and capabilities of the client device; and
transmit a plurality of fragments of the media content to the client device, each of the fragments corresponding to a different one of a plurality of consecutive segments of playback time of the media content;
wherein the fragments include, for each of the one or more bit rates, at least one fragment.

14. The system as recited in claim 13, wherein the feedback indicates at least one of: a bandwidth of the client device, a latency of the client device, or an amount of content in a buffer of the client device.

15. The system as recited in claim 13, wherein the capabilities of the client device comprise at least one of: screen size, screen resolution, video codec(s) that are supported, audio decoder capabilities, maximum frame rate, or maximum frame size.

16. The system as recited in claim 13, the computing devices being further configured to:
retrieve or generate at least one file including the fragments of the media content;
wherein transmitting the plurality of fragments includes transmitting the file to the client device.

17. The system as recited in claim 13, the computing devices being further configured to:
select the bit rates and fragments in response to receiving the request for media content.

18. The system as recited in claim 13, where the bit rates include two or more bit rates, the computing devices being further configured to:
for one of the consecutive segments of playback time of the media content, ascertain quality values associated with two or more fragments of the media content, each of the two or more fragments corresponding to a different one of the bit rates, each of the quality values being a measure of a visual quality of a corresponding one of the two or more fragments of the media content; and
selecting one of the two or more fragments based, at least in part, on the quality values.

19. The system as recited in claim 13, the computing devices being further configured to:
determine that the client device supports MPEG-4 file format.

20. The system as recited in claim 13, the computing devices being further configured to:
determine whether the client device supports fragmented MPEG-4 file format;
wherein the processors and memory are further configured to transmit the fragments of the media content based, at least in part, on whether the client device supports fragmented MPEG-4 file format.

21. The system as recited in claim 13, wherein the bit rates consist of a single bit rate.

22. The system as recited in claim 13, wherein the bit rates comprise two or more bit rates.

23. The system as recited in claim 13, wherein the request for media content does not request fragments of the media content at the one or more bit rates.

24. The method as recited in claim 1, wherein a manifest is not provided to the client device.

25. The method as recited in claim 5, further comprising:
determining, by the servers, that the client device supports fragmented MPEG-4;
wherein transmitting the fragments of the media content includes generating and transmitting an MPEG-4 stream including the fragments of the media content.

26. The method as recited in claim 5, the conditions including the bandwidth of the client device.

* * * * *